(12) United States Patent
Deck

(10) Patent No.: US 6,894,788 B2
(45) Date of Patent: May 17, 2005

(54) INTERFEROMETRIC SYSTEM FOR AUTOMATED RADIUS OF CURVATURE MEASUREMENTS

(75) Inventor: Leslie L. Deck, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 154 days.

(21) Appl. No.: 09/988,891

(22) Filed: Nov. 19, 2001

(65) Prior Publication Data

US 2002/0126293 A1 Sep. 12, 2002

Related U.S. Application Data

(60) Provisional application No. 60/252,116, filed on Nov. 20, 2000.

(51) Int. Cl.[7] ............................................. G01B 9/02
(52) U.S. Cl. ..................................................... 356/513
(58) Field of Search ............................... 356/512, 513, 356/514, 489, 495

(56) References Cited

U.S. PATENT DOCUMENTS

| | | |
|---|---|---|
| 4,572,628 A | 2/1986 | Nohda |
| 4,594,003 A | 6/1986 | Sommargren ............... 356/489 |
| 4,787,743 A | 11/1988 | Nohda |
| 5,059,022 A | 10/1991 | Ookawa |
| 5,090,811 A | 2/1992 | Donaldson |
| 5,280,336 A | 1/1994 | Fantone |
| 5,473,434 A | 12/1995 | De Groot et al. |
| 5,706,086 A * | 1/1998 | LaFleur ...................... 356/513 |
| 5,742,381 A | 4/1998 | Ueno |
| 5,880,841 A * | 3/1999 | Marron et al. .............. 356/512 |
| 5,907,404 A | 5/1999 | Marron et al. |

OTHER PUBLICATIONS

Deck, L.; Absolute distance measurements using FTPSI with a widely turnable IR laser, Proc. SPIE, 4778, 218–226 (2002).
Gerchman, M. and Hunter, G., "Differential technique for accurately measuring the radius of curvature of long radius concave optical surfaces," Proc. SPIE vol. 192 (1979).
Selberg, L., "Radius measurement by interferometry," Opt. Eng. 31 (7) 1961–1966 (1992).
Strzelecki, E. and Coldren, L., "Characterization of tunable single–frequency lasers with an all fiber interferometer," Opt. Fiber Comm. Conf. Proc., New Orleans, LA, 1988.

* cited by examiner

Primary Examiner—Samuel A. Turner
(74) Attorney, Agent, or Firm—Fish & Richardson P.C.

(57) ABSTRACT

An interferometric system for measuring the radius of curvature of a measurement object that includes a tunable coherent radiation source capable of emitting a radiant energy beam having a characteristic wavelength and of scanning the characteristic wavelength over a range of wavelengths; an unequal path interferometer which during operation includes a reference object and the measurement object and which receives a portion of the radiant energy beam from the tunable radiant energy source and generates an optical interference pattern; a detecting system including a detector for receiving the optical interference pattern; and a system controller connected to the tunable radiant energy source and the detecting system. The controller is programmed to cause the tunable radiant energy source to scan the characteristic wavelength over the range of wavelengths while concurrently monitoring the optical interference pattern via the detecting system and further programmed to calculate the radius of curvature of a surface of the measurement object from the monitored optical interference pattern.

32 Claims, 13 Drawing Sheets

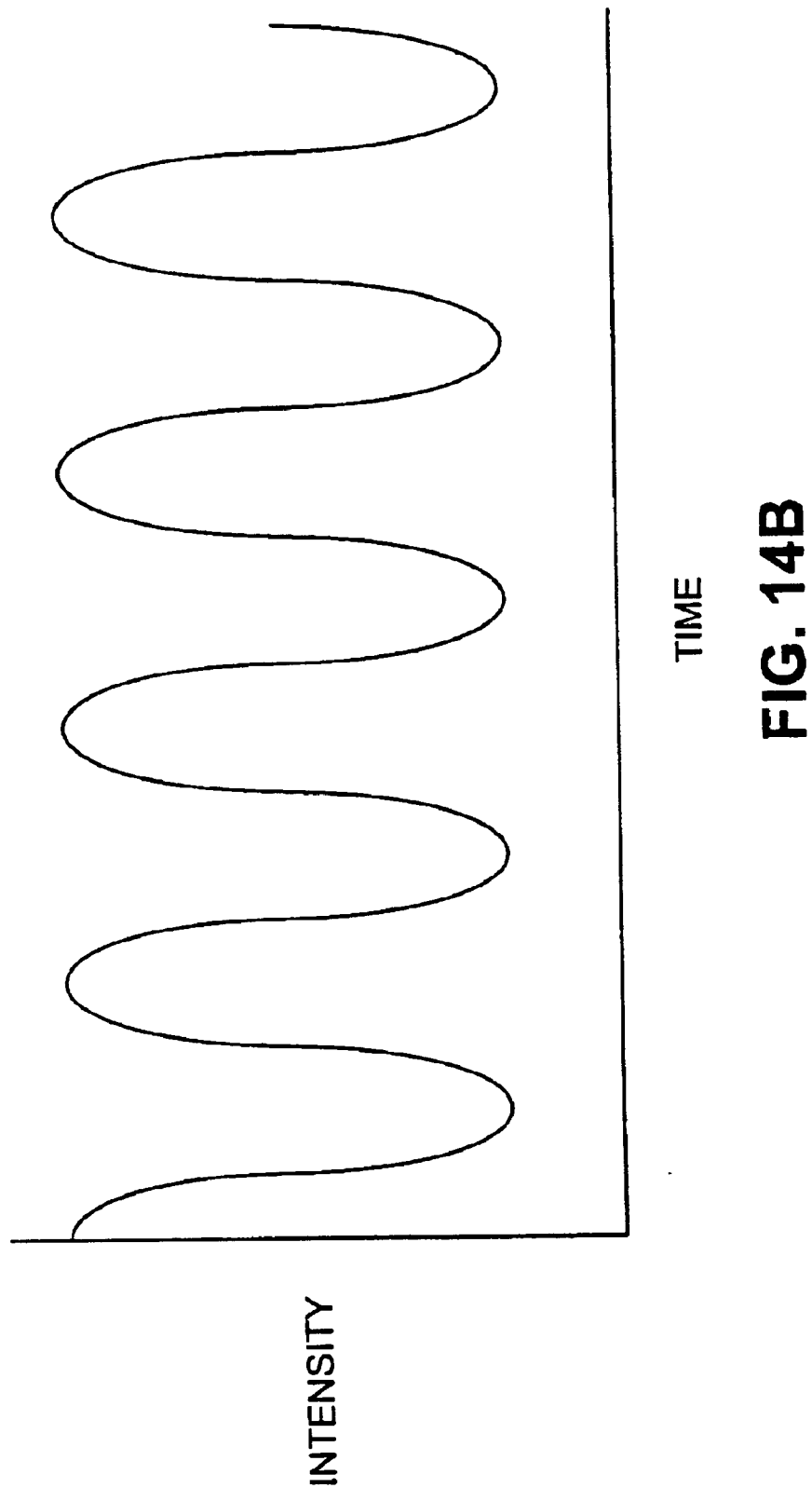

INTERFEROMETRIC SYSTEM FOR AUTOMATED RADIUS OF CURVATURE MEASUREMENTS

RELATED APPLICATIONS

Under 35 U.S.C. §119(e)(1), this application claims benefit of prior U.S. Provisional Applications No. 60/252,116, entitled "AUTOMATED RADIUS MEASUREMENTS" filed Nov. 20, 2000 and incorporated herein by reference.

TECHNICAL FIELD

This invention relates to radius of curvature measurements, and more particularly to an apparatus and automated method for determining the radius of curvature for both concave and convex surfaces.

BACKGROUND

A general method for determining the radius of curvature of an object's surface is based on a differential measuring technique. In the differential measuring technique, a technician positions a reference element and the object to form a retroreflecting cavity by centering each element on an optical centerline and orienting the two elements so that they are parallel to each the other. A retroreflecting cavity forms when the two elements are spaced apart such that collimated light entering the cavity through the reference element is brought to a focus on the surface of either the element or object. The null order of the retroreflecting cavity characterizes how many times a light ray entering the cavity parallel to but off-axis with respect to the optical centerline, bouncing between the reference element and the object and intersecting the optical axis at either the reference element or object, strikes the surface of the object before it exits the cavity parallel to but off-axis with respect to the optical centerline. The null order changes as the object having a single radius of curvature is translated closer to or away from the reference element. The radius of curvature is calculated via a paraxial ray approximation by measuring the distance in cavity length between successive null orders. Differential techniques for measuring radii of curvature are discussed, for example, in "Differential technique for accurately measuring the radius of curvature of long radius concave optical surfaces" published in SPIE, 192, 75–84, 1979.

Typically, radii measurement techniques such as those described above required time consuming and error generating manual adjustments in determining the radius of curvature of an object.

SUMMARY

In general, in one aspect, the invention features an interferometric system for measuring the radius of curvature of a measurement object. The system includes a tunable coherent radiation source capable of emitting a radiant energy beam having a characteristic wavelength and of scanning the characteristic wavelength over a range of wavelengths; an unequal path interferometer which during operation includes a reference object and the measurement object and which receives a portion of the radiant energy beam from the tunable radiant energy source and generates an optical interference pattern; a detecting system including a detector for receiving the optical interference pattern; and a system controller connected to the tunable radiant energy source and the detecting system. The controller is programmed to cause the tunable radiant energy source to scan the characteristic wavelength over the range of wavelengths while concurrently monitoring the optical interference pattern via the detecting system and further programmed to calculate the radius of curvature of a surface of the measurement object from the monitored optical interference pattern.

Preferred embodiments include one or more of the following features. The system controller is further programmed to calculate a phase shift in the measured optical interference pattern caused by scanning the characteristic wavelength. The system controller uses the calculated phase shift to compute the radius of curvature. The system controller is also further programmed to compute an optical path difference from the calculated phase shift and it uses the computed optical path difference to compute the radius of curvature. To compute the radius of curvature, the system controller is programmed to use numerical simulation or use recursive computation techniques. During operation the reference and measurement objects form an interferometric cavity with the measurement object approximately in a null position and the system controller is further programmed to correct the computed radius of curvature to take into account possible initial positioning errors of the measurement object relative to the null position. In some embodiments, the measurement object in the interferometric cavity is in a null position having a null order of n, wherein n is an integer at least as great as 2, and the system controller is programmed to compute the null order for the interferometric cavity.

Also, preferred embodiments might include the following additional features. The tunable radiant energy source is a tunable light source. The unequal path interferometer is a Fizeau interferometer. The system also includes a wavelength change monitor configured to monitor changes in the characteristic wavelength of the radiant energy source. In that case, the system controller is arranged to receive output from the wavelength change monitor and is programmed to calculate the radius of curvature of the surface of the measurement object from a monitored change in the wavelength and the monitored optical interference pattern. In addition, the system controller is programmed to calculate the change in the characteristic wavelength and a phase variation of the optical interference caused by scanning the characteristic wavelength over the range of wavelengths and it is programmed to use the calculated wavelength change and the calculated phase variation to calculate an optical path difference in the interferometer, and then use the computed optical path difference to compute the radius of curvature.

Also, the wavelength change monitor includes a detector and an unequal fixed path length interferometer (e.g. an optical fiber interferometer, a Michelson interferometer, or a Mach-Zehnder interferometer). The reference object has a curved surface (e.g. one which is concave).

In general, in another aspect, the invention features an interferometric system includes a tunable coherent radiation source capable of emitting a radiant energy beam having a characteristic wavelength and of scanning the characteristic wavelength over a range of wavelengths; a wavelength change monitor configured to monitor a change in the characteristic wavelength of the radiant energy beam; an interferometer which during operation includes a reference object and the measurement object to form an interferometric cavity and which during operation also receives the radiant energy beam from the tunable light source and generates an optical interference pattern therefrom; and a detecting system comprising a detector for receiving the optical interference pattern.

In general, in yet another aspect, the invention features a method for interferometrically determining a radius of curvature of a curved surface of a measurement object. The method includes positioning the measurement object relative to a reference object to form an interferometric cavity; scanning a characteristic wavelength of a radiant energy beam over a range of wavelengths; recording an optical interference signal caused by the interferometric cavity as the characteristic wavelength of the radiant energy beam scans over a range of wavelengths; extracting a phase variation from the optical interference signal; determining a relative change in the characteristic wavelength which caused the extracted phase variation; determining an optical path difference between the reference and measurement objects from the phase variation and the relative change in frequency of the characteristic wavelength; and calculating the radius of curvature for the curved surface of the measurement object.

Preferred embodiments of the invention might include one or more of the following features. The radius of curvature is calculated from the optical path difference and a null order of the interferometric cavity. The method also includes determining a null order of the interferometric cavity, e.g. by performing mechanical phase shifting. The operation of positioning of the measurement object involves positioning it relative to the reference object so as to form a retroreflecting cavity having a null order equal to n, wherein n is an integer that is at least as large as 2. The method also includes extracting a 2-dimensional phase variation from the optical interference signal and then using the 2-dimensional phase information to correct the calculated optical path difference between the reference and measurement objects. The operation of determining the relative change in the optical frequency of the characteristic wavelength involves monitoring the relative optical frequency change of the characteristic wavelength.

The invention enables one to measure both concave and convex radii of objects spanning four orders of magnitude, e.g., about 10 mm to about 150 m, to high precision, e.g., 0.001%. The invention also enables one to simultaneously provide a measurement of the surface profile of the object.

Embodiments of the invention may include one or more of the following advantages. They enable an operator to determine the radii of objects automatically and without physically contacting the objects, i.e., non-contact. The automated operation of some embodiments of the invention facilitate measuring a high number of object radii such as in production environments. The invention enables one to build an instrument that is robust and automatically corrects for variations in the initial positioning of the object within the instrument. It also enables one to rapidly determine the object radii, e.g. in less than one second. The invention also enables one to construct an instrument that is insensitive to temperature and Abbé errors.

Other advantages of various embodiments of the invention include the ability to measure the radius of curvature of spherical surfaces to high precision. Embodiments can be adapted to measure both concave and convex surfaces spanning a large range of curvatures, to require a minimum of manual preparation, to provide a means for automated measurement of similar surfaces in a production environment, to increase the throughput of such measurements, to concurrently measure test surfaces topography, and to minimize the influence of environmental effects that may degrade performance.

The details of one or more embodiments of the invention are set forth in the accompanying drawings and the description below. Other features, objects, and advantages of the invention will be apparent from the description and drawings, and from the claims.

Figure 10:
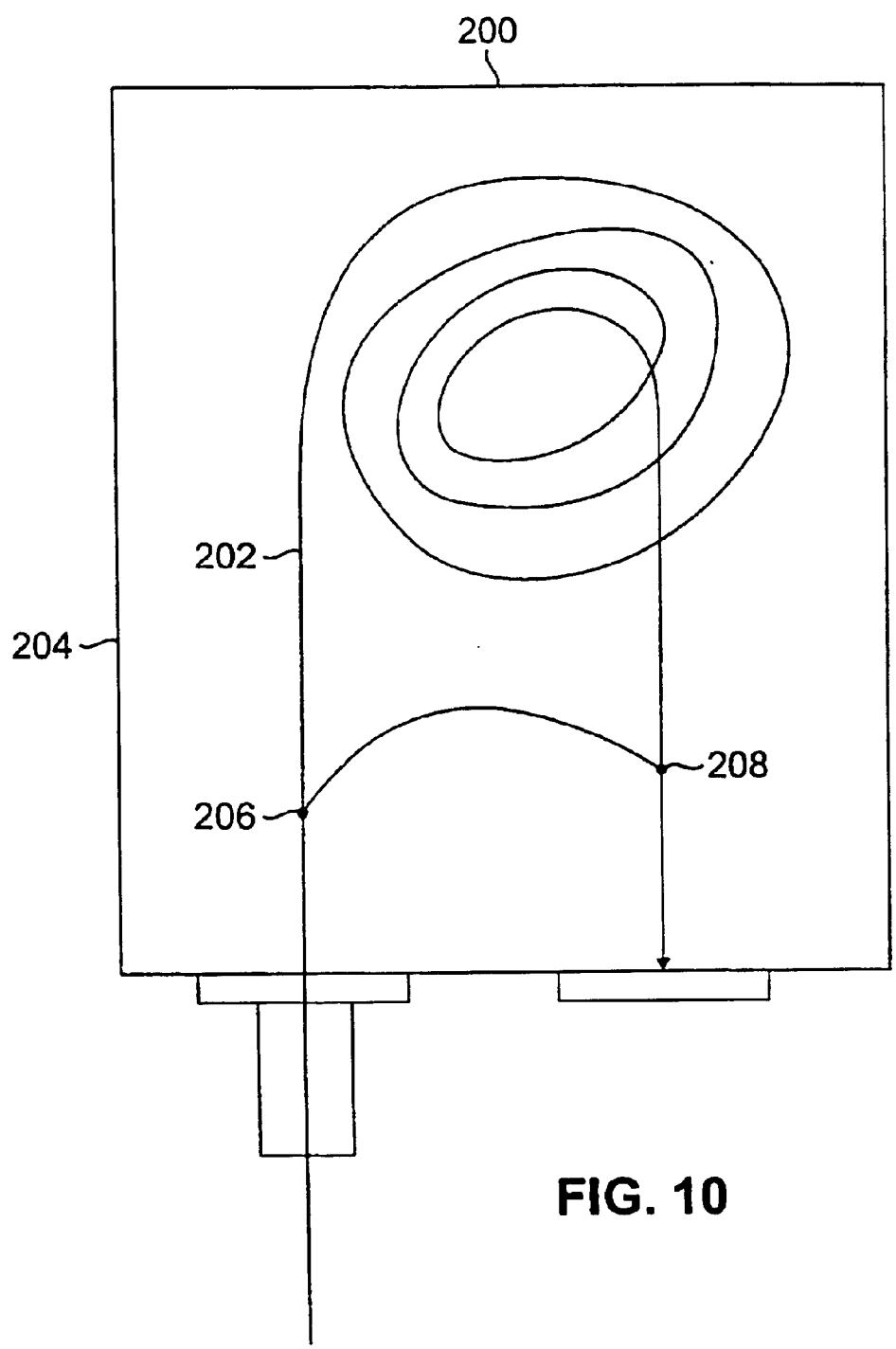
Figure 11:
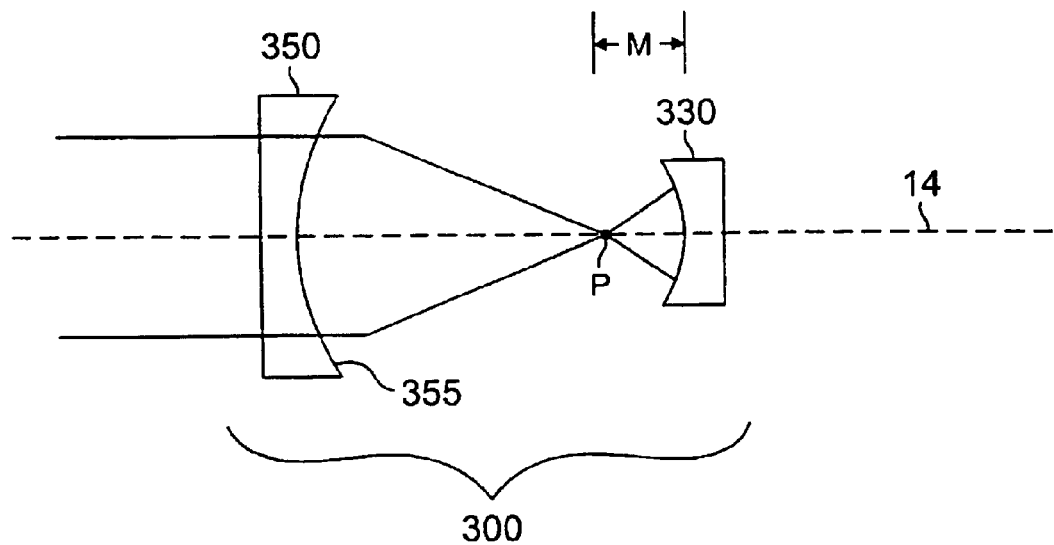
Figure 12:
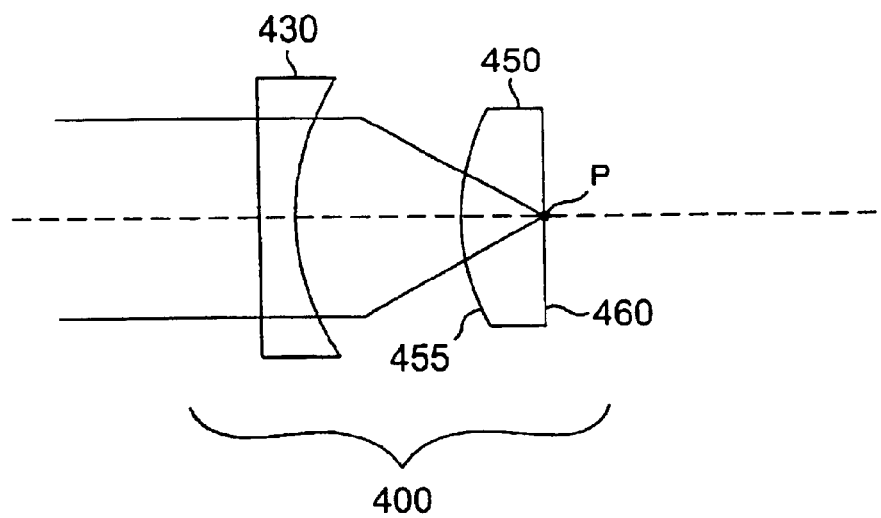
Figure 13:
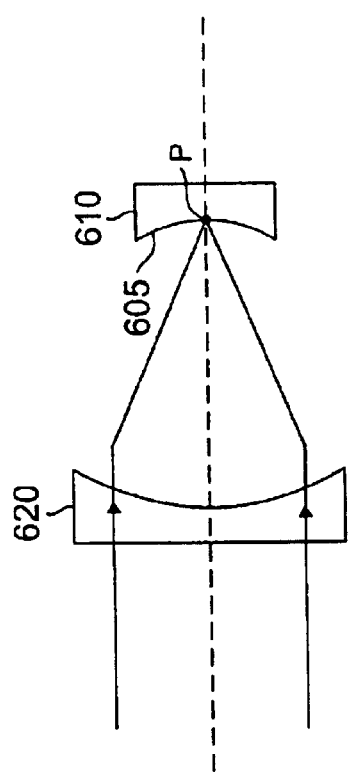
Figure 14A:
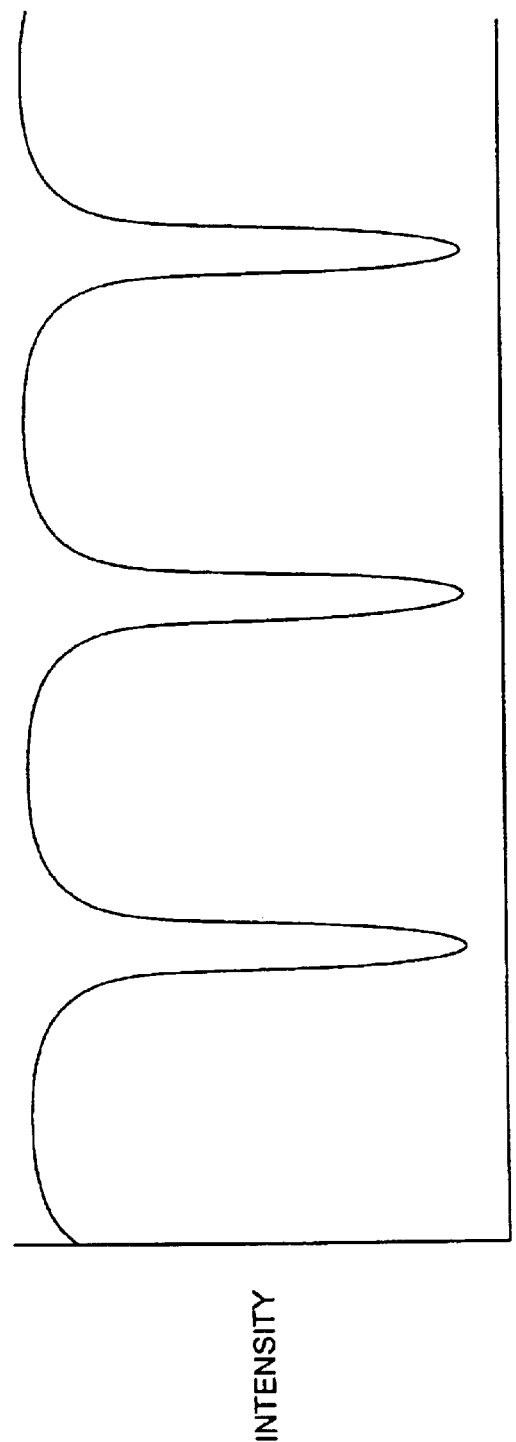

as a function of a, F/R;

FIG. 10 is a schematic diagram of an alternative wavelength monitor;

FIG. 11 is a schematic diagram of a cavity geometry of Fizeau interferometer;

FIG. 12 is another schematic diagram of a cavity geometry of Fizeau interferometer;

FIG. 13 is another schematic diagram of a cavity geometry of Fizeau interferometer;

FIG. 14A is a plot of a intensity history distorted by multiple beam interference; and FIG. 14B is a plot of an undistorted intensity history.

Like reference symbols in the various drawings indicate like elements.

DETAILED DESCRIPTION

An automated instrument provides a method for measuring both concave and convex radii of an object spanning over at least 4 orders of magnitude, e.g., about 10 mm to about 150 m, to high precision, e.g., 0.001%.

In general, the automated instrument includes a tunable light source, an unequal path interferometer cavity, and a detection system. The interferometric cavity is formed between a reference object having a known focal length and a curved measurement object. The curved measurement object is placed relative to the reference object in the interferometric cavity to form a retroreflecting or a confocal cavity. In a retroreflecting or confocal cavity, an optical wave front returning from the cavity after one or more reflections from the measurement object surface, is substantially identical to an optical wave front reflecting from a surface of the reference object.

In the retroreflecting configuration, the beam comes to focus on a surface of either the measurement object or the reference object. This is also sometimes referred to as the cats-eye configuration. The cavity has a null order that characterizes how many times a light ray entering the cavity reflects off the test object before it exits the cavity. The cavity null order changes as the measurement object is translated closer to or away from the reference object. Also, the cavity is characterized by a null position, which refers to the separation distance between the reference and test objects of the cavity with a particular null order.

In a confocal cavity or confocal configuration, the wavefront is perpendicular to the surfaces of both the reference object and the test object.

The cavity for a paraxial region produces an optical interference pattern having a single interference fringe when the tunable light source supplies coherent radiation into the cavity. At a fixed null position, the fringe intensity oscillates in a sinusoidal pattern as the tunable source is scanned over a range of wavelengths. The detection system monitors the oscillating interference pattern. The automated instrument measures the radius of curvature of the measurement object, positioned relative to a reference object having a known focal length at a specific null position, by determining the optical path difference (OPD) of that cavity, i.e., the spacing between the reference object and the measurement object. As will be described in greater detail below, the instrument determines the OPD by scanning the tunable light source over a range of wavelengths, monitoring an oscillating interference pattern caused by scanning the wavelength, determining a phase variation of the monitored interference pattern as the wavelength is scanned, and determining the relative change in wavelength of light emitted by the tunable source that generated the phase variation.

Figure 1:
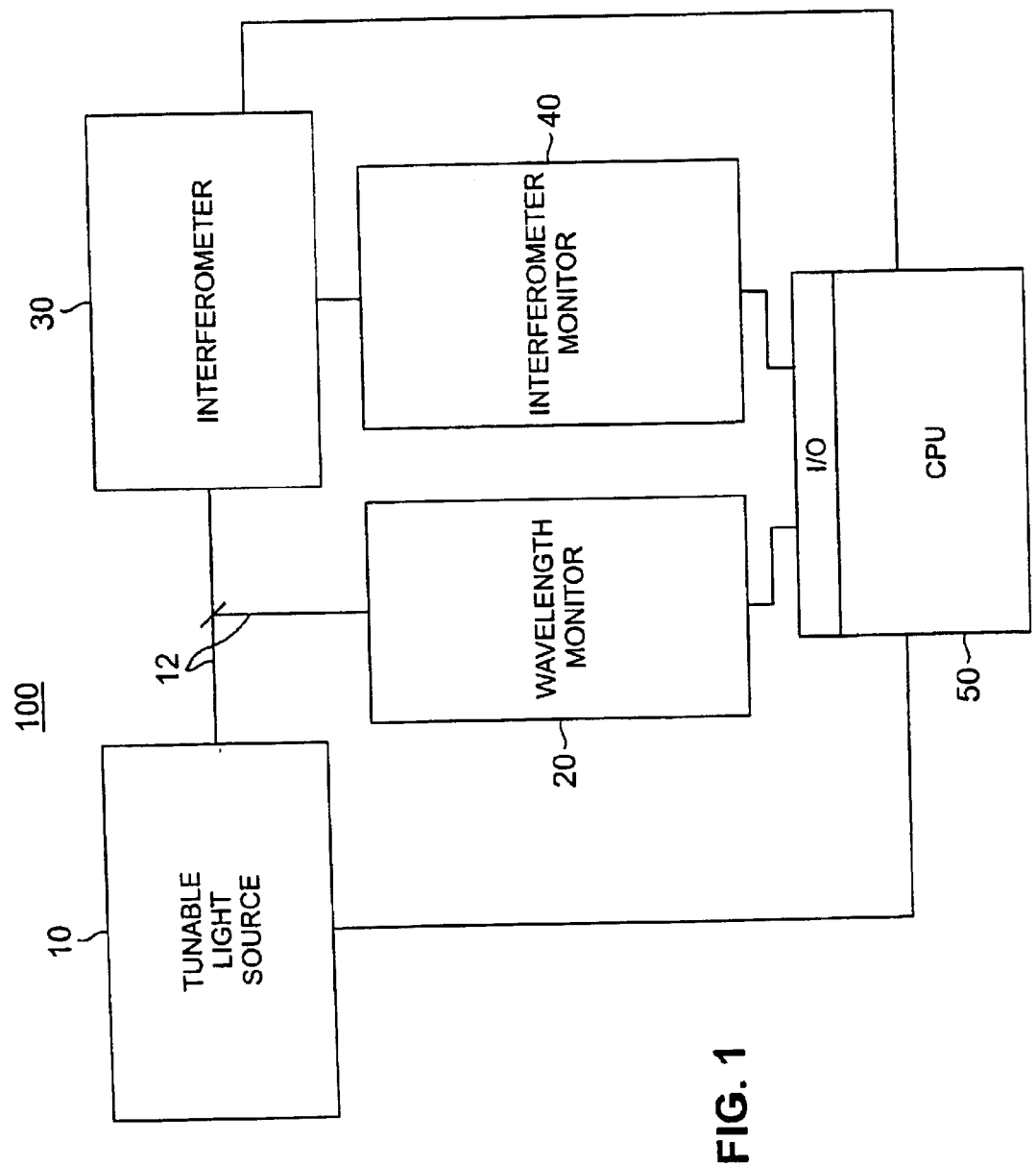
FIG. 1 is a schematic diagram of an apparatus for measuring the radius of curvature.

Referring to FIG. 1, a radius of curvature measurement apparatus 100 includes a tunable light source 10 that emits radiant energy 12 for an interferometer 30. In the described embodiment, the "radiant energy" is light but the term is meant to include electromagnetic energy of in many other frequency ranges.

A wavelength monitor 20 measures the change in wavelength of light emitted by source 10 and an interferometer monitor 40 monitors the resulting interference produced by the interferometer. A central processing unit 50 is programmed to calculate the radius of curvature of a concave or convex surface of a test object 44 placed in interferometer 30 (See FIG. 2) based upon the null order of the interferometer cavity and on the optical path difference (OPD) of the cavity as derived from the electronic output of wavelength monitor 20 and interferometer monitor 40.

Large Radii (Radii of Curvature Greater than About 100 mm)

Figure 2:
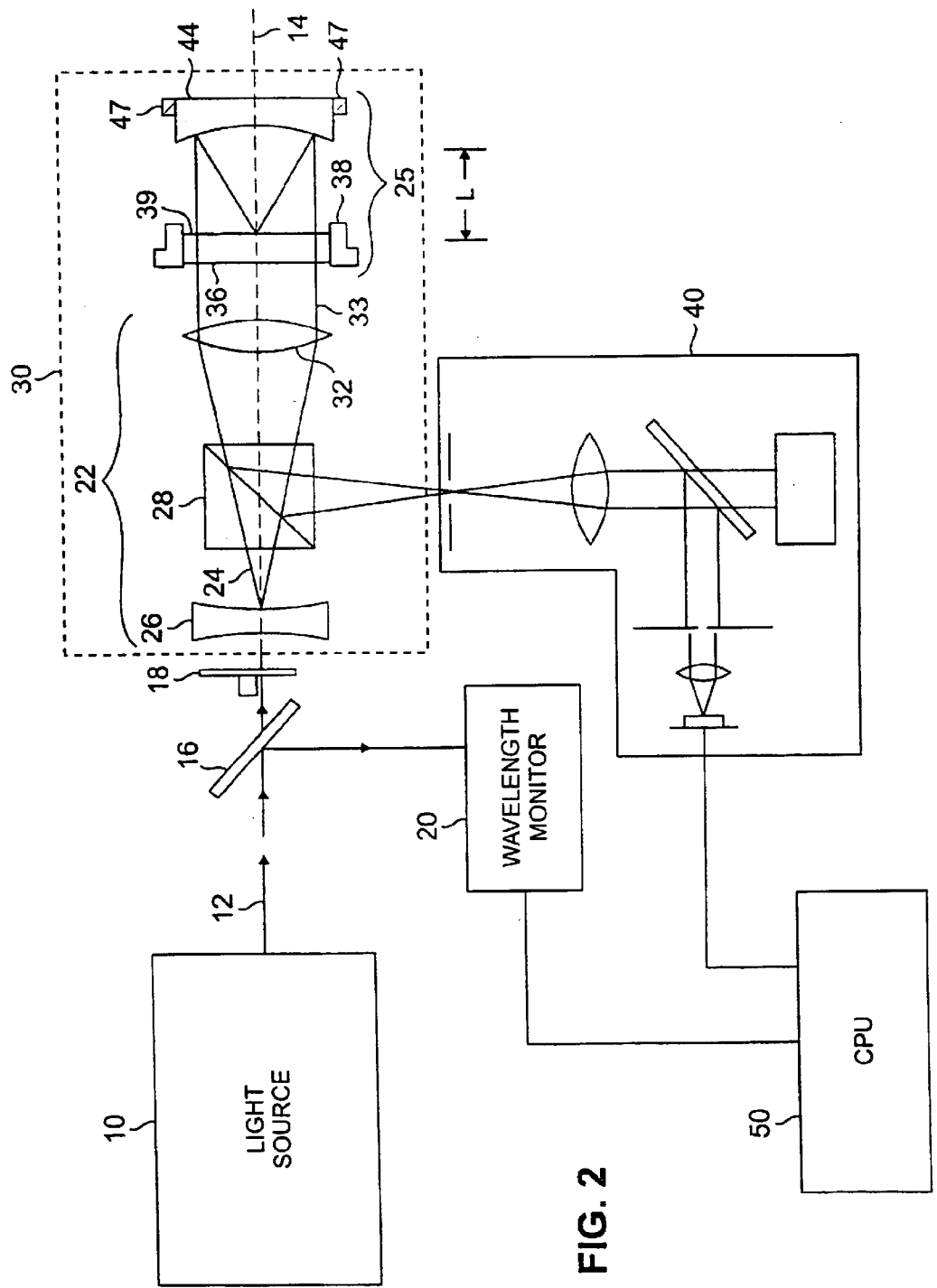
FIG. 2 is an expanded schematic diagram of the apparatus of FIG. 1.

Referring to FIG. 2, tunable light source 10, e.g. a VORTEX™ series external cavity diode laser available from New Focus, produces a nearly collimated and monochromatic beam 12 of coherent optical energy that propagates through a beamsplitter 16. Beamsplitter 16 redirects a portion of beam 12 into wavelength monitor 20, which may be a simple Michelson interferometer (FIG. 6), and allows the rest of beam 12 to propagate along optical path 14. An attenuator 18 positioned in optical path 14 after beamsplitter 16 controls the intensity of beam 12 propagating into interferometer 30. Interferometer 30 includes beam wavefront optics 22 and a Fizeau-type interferometer cavity 25. Beam wavefront optics 22 include a diverting lens 26, a beamsplitter 28, and a collimating lens 32. Diverging lens 26 converts beam 12 into a diverging wavefront 24 that passes through beamsplitter 28 and then through collimating lens 32, which collimates diverging wavefront 24 to produce a piano wavefront 33. For ease of illustration, only a single ray of wavefront 33 is shown. Plano wavefront 33 propagates into interferometer cavity 25 formed between a surface 34 of a reference object 36 and a curved surface 42 of test object 44. The distance, L, by which reference object 36 and test object 44 are separated depends on the magnitude of the curvature of surface 42 and whether or not the surface is concave or convex.

Figure 3:
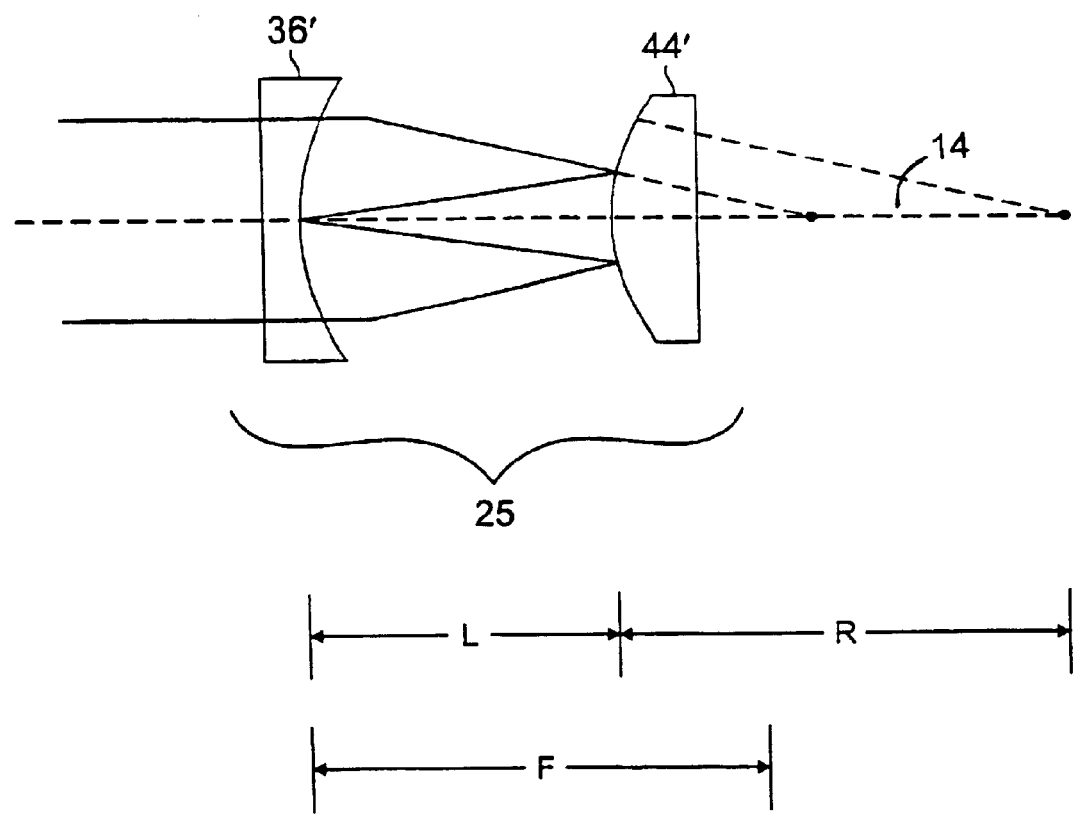
FIG. 3 is a schematic diagram of a Fizeau interferometric cavity.

In the Fizeau-type interferometer cavity of FIG. 2, surface 34 of the reference object is flat and the curvature of surface 42 of the test object is concave. However, when measuring test objects having a convex surface and a large radius of curvature, the reference object will have a concave surface (See FIG. 3). The radius of curvature of the reference surface and the spacing between the two surfaces are selected to satisfy the relationship $0<F-L<R/2$, where F is the focal length of the reference object, L is the gap between the reference and test objects, and R is the radius of curvature of the test object. Mounts 38 and 47 hold reference object 36 and test object 44, respectively, and are translatable along optical axis 14 so as to change the distance between surface 34 and surface 42, i.e., change the OPD and null order of the cavity. As described below, apparatus 100 holds mount 47 stationary during radius of curvature measurements whereas apparatus 100 may move mount 38, e.g., a Phase Modulating Receptacle (PMR), to phase modulate the interferometric cavity and thereby determine the null order and generate a phase map of the curved surface of the test object.

Figure 4:
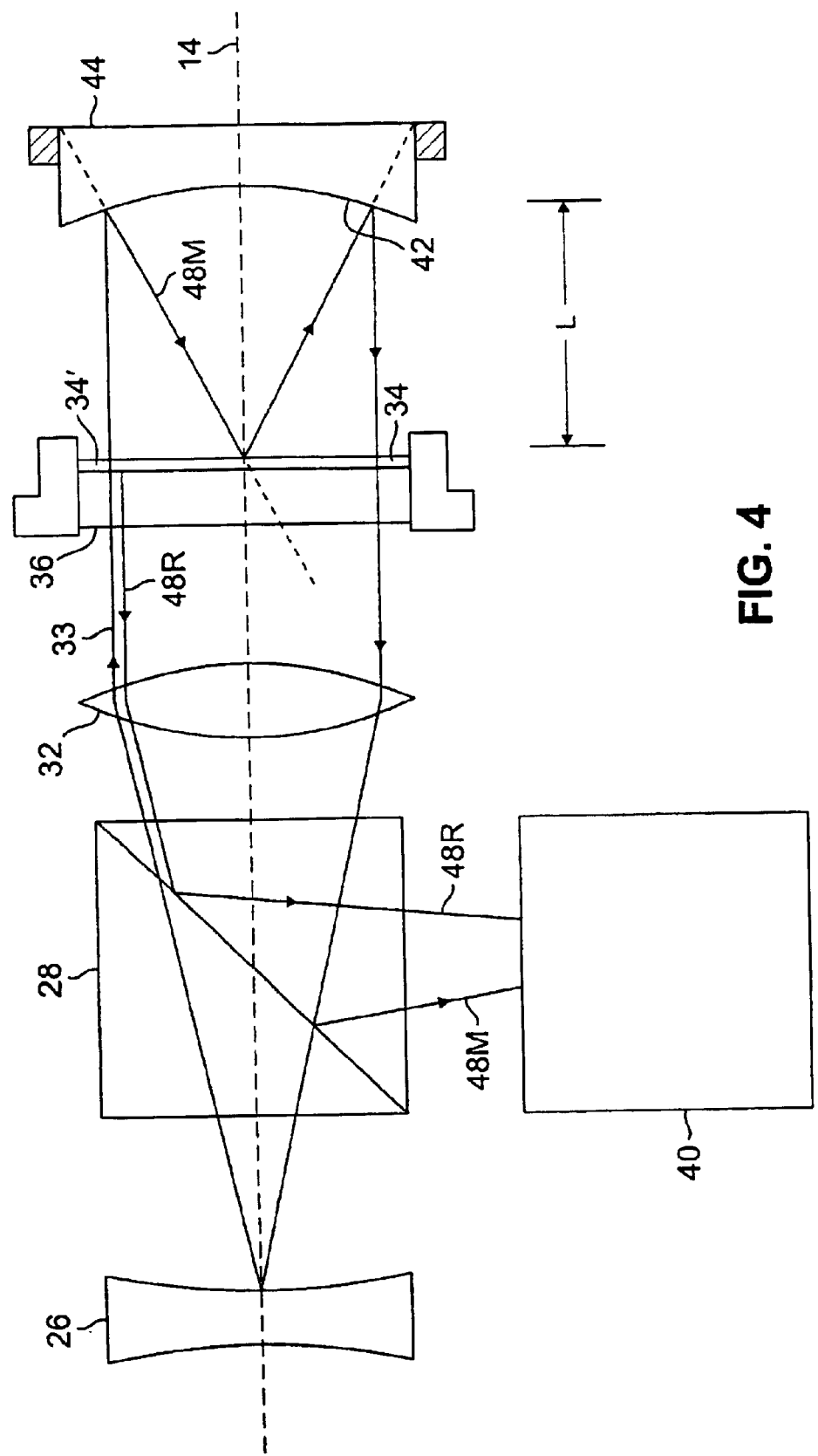
FIG. 4 is an expanded schematic diagram of the Fizeau interferometric cavity of the apparatus of FIG. 2.

Referring to FIG. 4, as piano wavefront 33 impinges on reference object 36, a portion of the wavefront reflects off of a partially reflective coating 34' on surface 34 as reference wavefront 48R. The appropriate reflectivity of coating 34' is determined below. The remaining portion of wavefront 33 propagates through coating 34' towards concave surface 42 which, in turn, reflects a portion of wavefront 33 as a measurement wavefront 48M back towards reference object 36. Depending upon the radius of curvature of surface 42 and the OPD, a portion of measurement wavefront 48M will typically be reflected back and forth inside of the cavity at a specific number of locations on surface 42 and surface 34. At each point of reflection on surface 34, a portion of measurement wavefront 48M propagates through the reference object. Collimating lens 32 collects and focuses both reference wavefront 48R and measurement wavefront 48M into beamsplitter 28 which, in turn, reflects a portion each wavefront 48M and 48R towards interferometer monitor 40.

Figure 5:
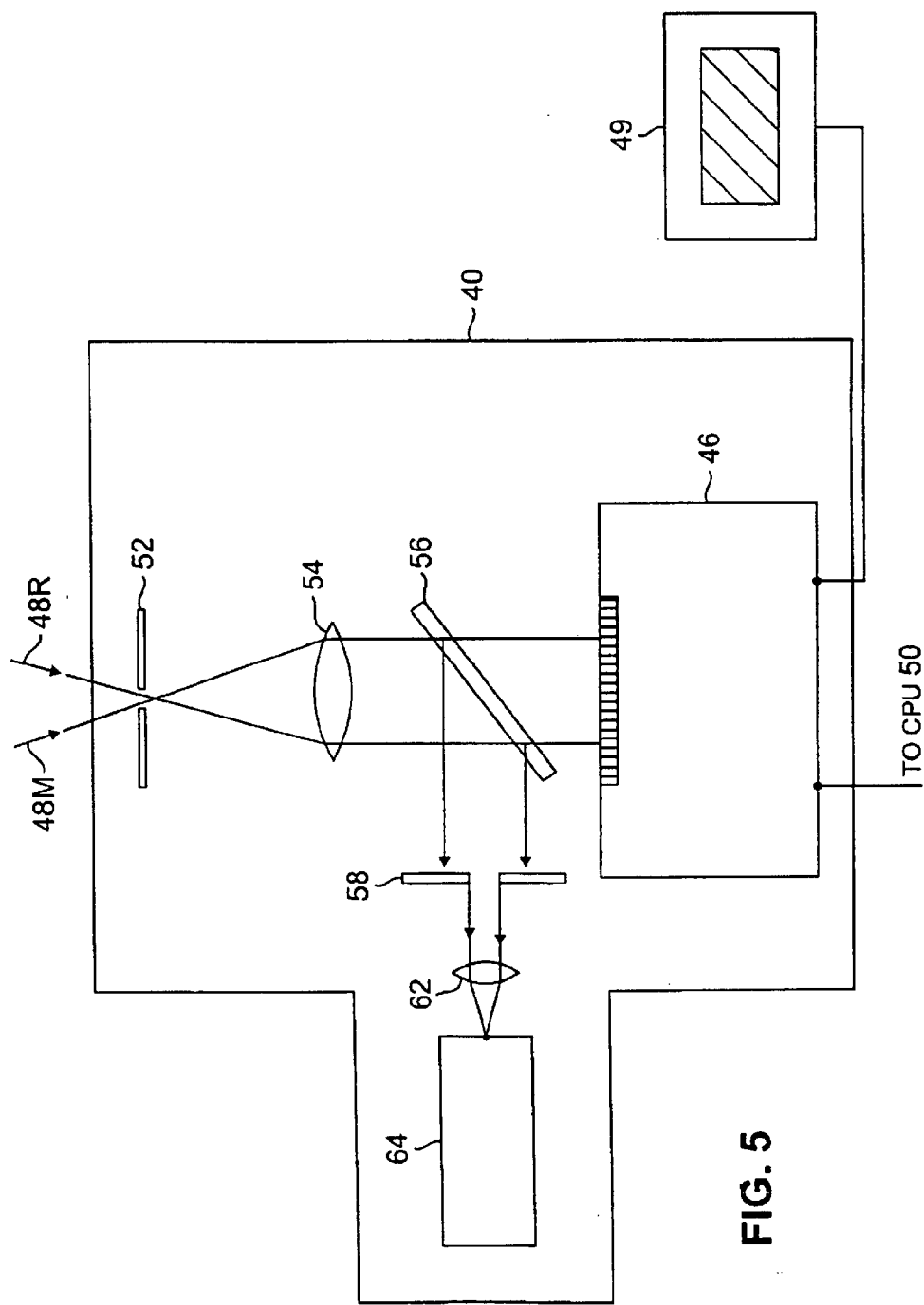
FIG. 5 is a schematic view of the interferometer monitor of the apparatus of FIG. 2.

Referring to FIG. 5, interferometer monitor 40 includes a main aperture 52, a collimating lens 54, a beamsplitter 56, a charge-coupled device (CCD) camera 46 having a 2-dimensional array of pixels, an aperture 58, a lens 62, and a cavity detector 64. Camera 46 sends electronic signals to CPU 50 and a visual output monitor 49. Collimating lens 32 (FIG. 4) focuses reference wavefront 48R and measurement wavefront 48M at main aperture 52 of interferometer monitor 40 so that only those portions of the reference and measurement wavefronts parallel to optical axis 14 are detectable by monitor 40. Collimating lens 54 collimates the filtered components of wavefronts 48R and 48M onto beamsplitter 56 which transmits a portion of the collimated wavefronts into camera 46 and reflects a portion of the collimated wavefronts through aperture 58 and into lens 62. Lens 62, in turn, focuses the wavefronts onto cavity detector 64. Aperture 58 limits the solid angle viewing area so that detector 64 only receives the portion of the wavefronts near to the paraxial region.

Figure 6:
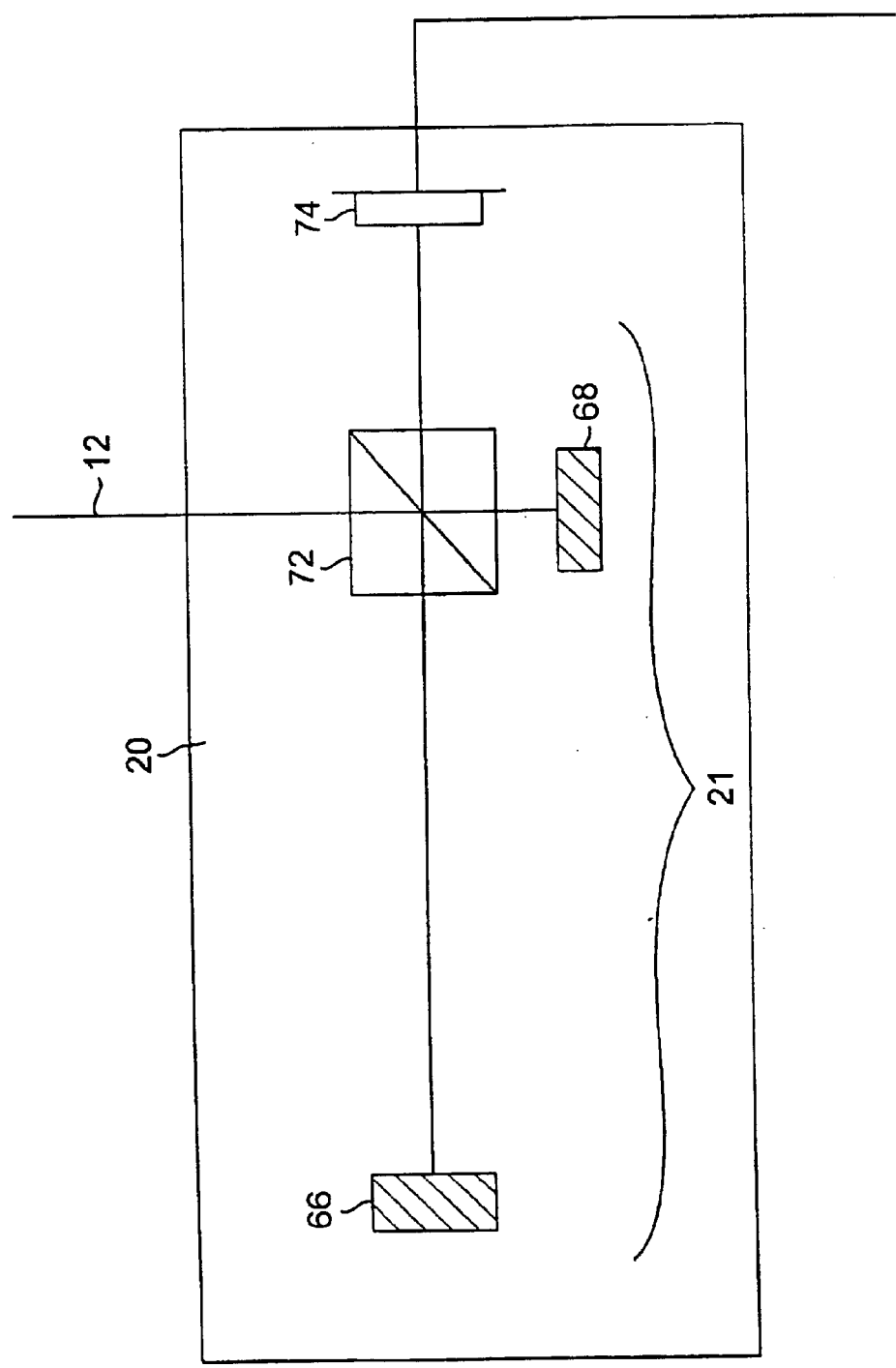
FIG. 6 is a schematic view of the wavelength monitor of the apparatus of FIG. 2.

Referring to FIG. 6, wavelength monitor 20 includes an unequal path length interferometer 21 having mirror 66 positioned further from a beamsplitter 72 than a mirror 68. A detector 74 records the interference image from interferometer 21.

Referring back to FIG. 2, during operation, a system operator positions a concave test object in mount 47 of interferometer 30 to form a Fizeau-type interferometer retroreflecting cavity with the reference object. Observing the visual output of camera 46 on monitor 49, the operator translates mount 47 along optical axis 14 to find a null position of the retroreflecting cavity. A null position exists when the light beam intersects optical axis 14 at either surface of the cavity and the null order is defined as the number of times that the beam strikes the test object before being imaged through aperture 52 and onto the camera. The null order of the arrangement shown in FIG. 4 is two.

The output of camera 46 includes a series of interference fringes which represents a 2-dimensional interference signal between the reference and measurement wavefronts imaged into interferometer monitor 40. Camera 46 is a 12 bit high dynamic range camera which helps the operator to better visualize the fringe patterns from the interfering wavefronts. The number of interference fringes observable on the output of the camera depends upon whether or not the test object is positioned in a cavity null position. When the operator translates the test object into a cavity null position, the number of interference fringes is less than the number of interference fringes when the test object is not in a null position. As a result, the operator observes the number of interference fringes on the camera while translating the test object to determine and locate the null positions. Once the operator nulls the cavity, apparatus 100 determines the radius of curvature automatically.

Before initiating the automated measurement sequence, the operator can enter the specific null order, if known, into CPU 50. As will be described in more detail below, the CPU uses the specific null order and the measured OPD of the cavity in a recursion relationship to determine the radius of curvature of the test object. Using those same recursion relationships, the operator can also determine the specific null order by knowing both an approximate value for the radius of curvature of the test object and the distance between the test object and reference object. If an approximate value of the radius of curvature is unknown, apparatus 100 can automatically determine the null order by fixing the wavelength, translating mount 38 a known distance, and measuring the relative change in phase of the Fizeau interferometer cavity.

Apparatus 100 measures the relative change in phase of the cavity via camera 46. Camera 46 sends electrical outputs to CPU 50 that are proportional to the intensity of the interference signal of the focused reference and measurement wavefronts on each pixel of the camera. As apparatus 100 changes the OPD of the cavity by moving mount 38, the interference signal from each pixel of camera 46 oscillates according to the relationship $$I_o = C_0 30\ C_1 \cos(\phi) \quad (1)$$

where $C_0$ and $C_1$ are constants, $\phi$ is the overall phase. A change in the overall wavefront phase is related to the change in the gap, L, between the reference and test object, and the null order via the expression $$\Delta\phi = 2nNk\Delta L \quad (2)$$

where $\Delta\phi$ is the change in overall phase; n is the index of refraction (typically equal to 1 for air); N is the null order of the cavity; k is the wavenumber equal to $2\pi/\lambda$, in which $\lambda$ is the center wavelength of beam 12; and $\Delta L$ is the relative displacement of mount 38. Using equation 2, CPU 50 calculates N by knowing how far it translated mount 38 and measuring the change in phase caused by translating the mount.

CPU 50 also uses known-phase-shifting algorithms to analyze the oscillating intensity data for each pixel and thereby generate a 3-dimensional phase map of the test object's curved surface. CPU 50 stores the phase map into memory and, as described below, uses this map to correct the calculated radius of curvature for errors which result from errors in positioning the test object at a cavity null. The phase map can also be used to generate a surface profile of the test object. The ability of apparatus to profile completely the test object depends on the area of the test object sampled by camera 46. For convex test surfaces, the sampling area increases as the null order increases.

Recovering the phase from the oscillating intensity signal involves calculating the phase of the Fourier coefficient corresponding to the fundamental frequency of the intensity sine wave. This is done by Fourier transforming the signal, selecting out the complex coefficient a representing the amplitude of the frequency of interest and calculating $$\arctan\left(\frac{\mathrm{Im}(a)}{\mathrm{Re}(a)}\right).$$

Phase shifting algorithms can be found, for example, in *Optical Shop Testing* ($2^{nd}$ Ed.), Chapter 14, p. 501 (Wiley, New York, 1992). Fourier-series phase shifting algorithms are discussed in Applied Optics 34(22), 4723–4730 (1995) by P. de Groot, and in U.S. Pat. No. 5,473,434 and U.S. Ser. No. 09/349,593 filed on Jul. 9, 1999.

Once the CPU obtains the null order either by input from the operator or by translating mount 38 and recording the resulting phase change, apparatus 100 holds mount 38 in its original position and CPU 50 sends an electronic signal to light source 10 to scan the center wavelength of beam 12. As CPU scans the center wavelength, it concurrently records two series of intensity data (measurement points), one series measured by the interferometer monitor cavity detector and the other measured by the wavelength monitor, such that the data are synchronously related. This could be accomplished, for example, by assuring that each measured intensity measurement point resulting from a wavelength shift has a corresponding measured intensity resulting from a cavity phase shift. After completing the wavelength shift, the CPU analyzes the stored intensity histories from each monitor (monitors 20 and 40) with phase extracting algorithms, such as a sliding window FFT method, to determine the relative phase and wavelength shift between two widely separated measurement points in the shift sequence. Typically, the CPU determines the relative phase and wavelength shifts between an intensity measurement point recorded early in the shift sequence and an intensity measurement point recorded at a time near the end of the sequence. Changes in the center wavelength of beam 12 cause changes in the phase of the cavity according to $$\dot{\phi} = \frac{2\pi \dot{v} D}{c} \quad (3)$$

where $\dot{\phi}$ is the phase variation in the cavity, $\dot{v}$ is the frequency variation of beam 12, and D is the total cavity OPD. Apparatus 100 determines the optical frequency variation of beam 12, $v$, by measuring the phase change in the wavelength shift monitor while concurrently monitoring the phase change in the Fizeau interferometer. The phase in the interferometric cavity of the wavelength monitor is $$\phi_m = k_m L_m \quad (4)$$

where $\phi_m$ is the phase of the wavelength monitor cavity, $k_m$ is the wavevector of beam 12, and $L_m$ is the total OPD of the wavelength monitor cavity. Assuming the monitor cavity OPD is constant and using the expression for the wavevector, $k=2\pi/\lambda$, $k=\nu/c$, and Eqn. 4, the optical frequency variation can be expressed as $$\dot{\nu} = \frac{\dot{\phi}_m c}{2\pi L_m} \quad (5)$$

Substituting Eqn. 5 into Eqn. 3 and rearranging provides $$\frac{\dot{\phi}}{\dot{\phi}_m} L_m = D \quad (6)$$

D is approximately equal to 2NL, where L is the gap between the reference and test objects. Apparatus 100 calculates the OPD, D, with high precision by simultaneously measuring the shift of the center wavelength, i.e., $$\dot{\nu} = \frac{\dot{\phi}_m c}{2\pi L_m},$$

and its resulting phase variation of the Fizeau interferometric cavity, i.e., $$\dot{\phi} = \frac{2\pi \dot{\nu} D}{c}.$$

Once CPU 50 calculates the interferometer cavity OPD, it uses this value along with the null order to determine the radius of curvature of the test object. CPU 50 determines the radius of curvature using either a paraxial approximation or a numerical ray trace simulation. A paraxial approximation for concave surfaces is described by Gerchman and Hunter in SPIE Vol. 192 Interferometry p. 75–84 (1979) and results from applying a Gaussian image equation and a conjugate recursion formula. The paraxial approximation is further simplified by using Chebyshev polynomials which indicate that for concave mirrors, the gap between the reference optic and the test mirror, L, is related to the radius of test object, R, via $$L_{N-1} = C_{N-1} R \quad (7)$$

where N=2, 3 . . . is the null order and the $C_{N-1}$ are even order Chebyshev polynomials of the first kind having the form $T_{N+1}(X)$, (N=1, 3, 5, . . . ) where $x=z_N/R$ and of the second kind having the form $U_N(x)$, (N=2, 4, 6, . . . ) depending on whether N is even or odd.

Figure 7:
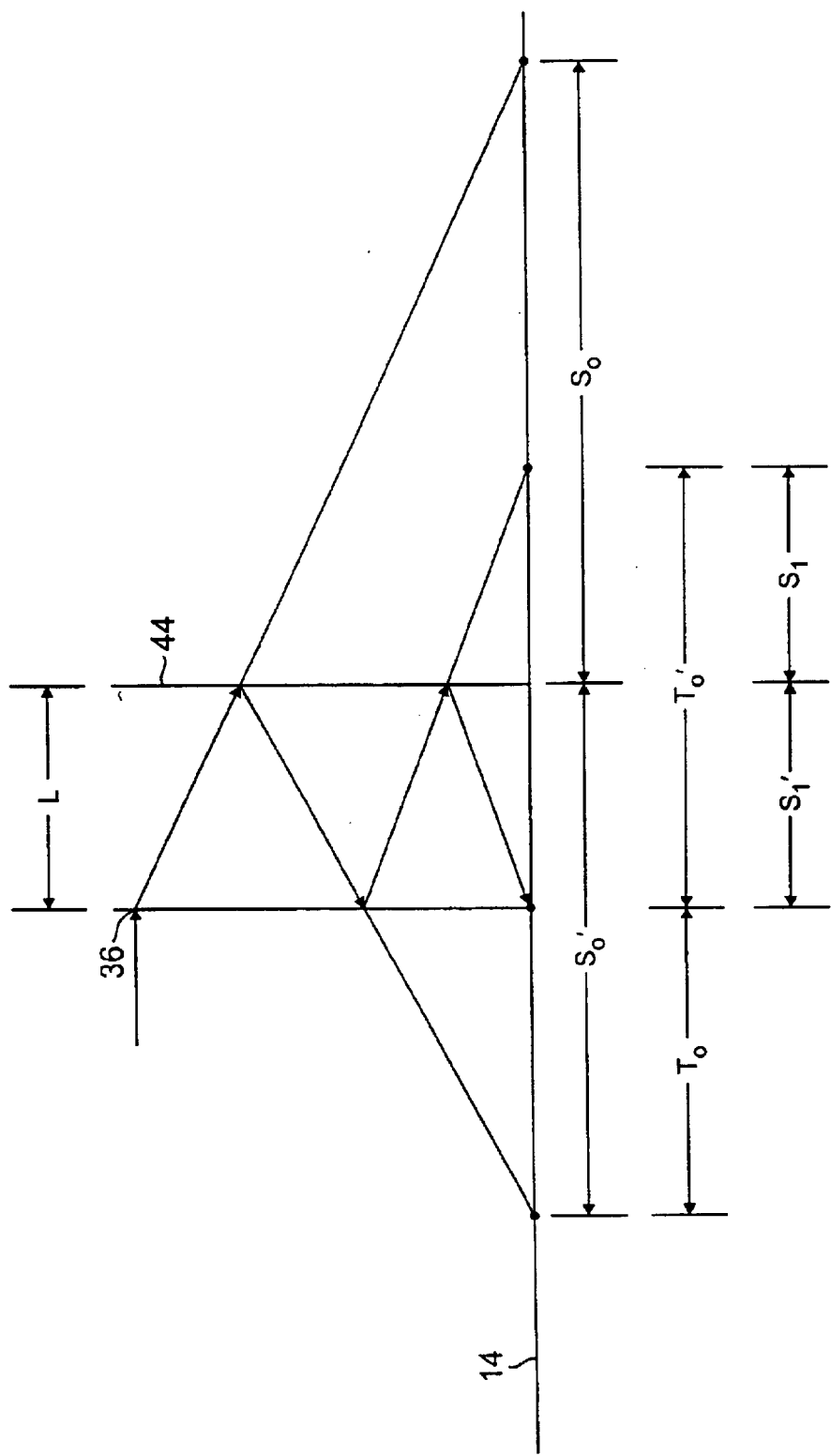
FIG. 7 is a schematic view of a retroreflecting cavity for measuring convex surfaces.

Referring to FIG. 7, the paraxial approximation for a convex surface having a radius R and a curved reference element having a focal length, F, is given by two relationships of the form:

$$\frac{2}{R} = \frac{1}{S_i} + \frac{1}{S'_i}, \text{ and } \frac{2}{F} = \frac{1}{T_i} + \frac{1}{T'_i} \quad (8)$$

where i=0,1, . . . n denotes the bounce number off of either the reference element or the test object, the distances $S_i$ are measured relative to the mirror and the distances $T_i$ are measured relative to the lens. For ease of illustrating the cavity, the measurement and test objects are shown as having planar surfaces. Using standard sign conventions, an equation relating $S_i$ and $T_i$ reduces to an equation relating the radius of the mirror R to the gap L and the focal length of the lens F. For $4^{th}$ order (4 bounces off the test object), the system is symmetrical about the optical axis. The paraxial approximation for the upper half of the optical axis produces the equations $$\frac{2}{R} = \frac{1}{S_0} + \frac{1}{S'_0}, \frac{2}{F} = \frac{1}{T_0} + \frac{1}{T'_0} \text{ and } \frac{2}{R} = \frac{1}{S_1} + \frac{1}{S'_1} \quad (9)$$

Following the sign convention (distances to the left of the reference element are negative and to the right are positive) results in four supplemental equations relating various distances:

$$S'_1 = -L, \ T_0 = S'_0 + L, \ T'_0 = S_1 + L \text{ and } S_0 = F - L \quad (10)$$

Substituting these relationships into the paraxial approximation to eliminate all the variables except L, F and R produces:

$$\frac{2}{F} = \frac{1}{\frac{R(F-L)}{2(F-L)-R} + L} + \frac{1}{\frac{RL}{2L+R} + L} \quad (11)$$

and solving for the correct root of R provides:

$$R = \frac{L(L-F)\left[8F - 16L + \sqrt{32}\,F\right]}{2F^2 + 16L^2 - 16LF} \quad (12)$$

Table 1 lists the equations governing the dependence of the radius on the gap L (and for convex mirrors, also on the focal length of the transmission sphere F) for the first 5 orders in the paraxial approximation.

TABLE 1

| N | R (Concave) | R (Convex) |
|---|---|---|
| 2 | R = 2L | $R = \frac{-2L(F-L)}{F-2L}$ |
| 3 | R = 4L | $R = \frac{-4L(F-L)}{F-2L}$ |
| 4 | $R = 2(2+\sqrt{2})L$ | $R = \frac{-L(F-L)(4F-8L+2\sqrt{2}\,F)}{(F^2-8FL+8L^2)}$ |
| 5 | $R = 2(3+\sqrt{5})L$ | $R = \frac{-L(F-L)(6F-16L+2\sqrt{5}\,F)}{(F^2-12FL+16L^2)}$ |
| 6 | $R = 4(2+\sqrt{3})L$ | $R = \frac{-4L(F-L)(2F-4L+\sqrt{3}\,F)}{(F^2-16FL+16L^2)}$ |

Alternatively, numerical simulations, such as ray tracing programs, can be used to calculate the radius of curvature. For instance, starting with a ray at the edge of the reference element, subsequent intersections of the ray with the test object and reference element can be calculated depending on the values assigned to the gap (L) between the reference element and the test object and the radius of curvature of the test object (R). By inverting this problem and using iterative function optimizing routines, the CPU determines the value of R that best fits a particular measured gap L.

Once CPU determines a value for the radius of curvature, it corrects this value to account for errors resulting from the operator's positioning of the test object at a cavity null position. As discussed above, the operator uses the visual output from camera 46 to determine when the test object is approximately in a null position. In general, due to human limitations, the operator cannot translate the test object to an exact null position and, as a result, positioning of the test object slightly behind or in front of the true null position causes fractional errors in the measured OPD and thereby produces an error in the computed radius on the order of about 0.03%. The positioning errors also produce focusing or imagining errors through the interferometer monitor which, in turn, result in an approximately quadratic phase deviation in the phase map of the test surface. Selberg discusses positioning and imaging errors in radius interferometry in Opt. Eng. 31, 1961–6 (1992).

As described above, apparatus 100 uses camera 46 to record a 2-dimensional intensity history of the interfering wavefronts as CPU translates mount 38. The CPU compares the measured phase map to a theoretical phase map. The CPU generates the theoretical phase map using ray tracing routines, the measured OPD, known null order and focal length of the reference element (if applicable), and the calculated radius of curvature. The CPU iteratively changes the value of the measured OPD, calculates a new theoretical phase map, and compares that new map to the measured phase map. The CPU can compare the theoretical and measured phase maps by monitoring the difference in phase between the two maps as a function of 2-dimension position. The CPU repeats this procedure until it minimizes the difference between the measured and theoretical phase maps. Once minimized, the adjusted OPD value corresponds to an OPD value which would have been measured by apparatus 100 if the test object were positioned to within about 1 micron of the exact cavity null position. CPU uses the null order and the adjusted OPD value, i.e., the value that produced the minimum difference between the measured and theoretical phase maps, to recalculate the radius of curvature. Apparatus 100 can also compare measured and theoretical 2-dimensional phase maps to correct errors in tip and tilt, as well as translation, of the test object.

Once the system operator has positioned a first test object having a specific radius of curvature, apparatus 100 can be used in an assembly line to monitor the quality of optical components each manufactured to have the same radius of curvature. CPU 50 of apparatus 100 can be programmed to translate mechanically successive optical components from an assembly line onto the preposition mount 47 and measure the radius of curvature of each element.

Null Fringe Interference Visibility and Reference Object Coatings

Figure 8:
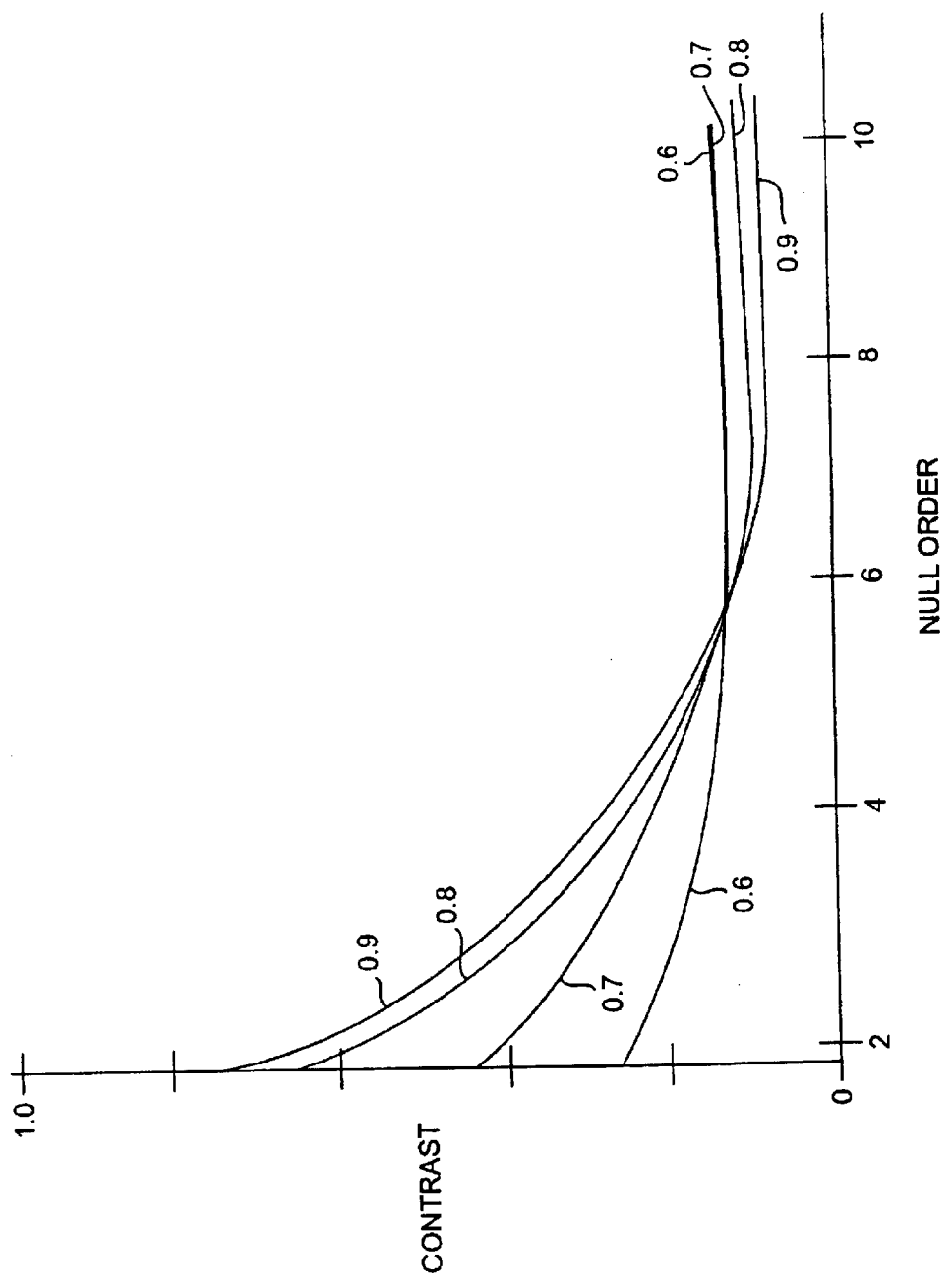
FIG. 8 is a plot of calculated contrast for coating reflectivities as a function of null order.

Null fringe visibility, or contrast, is important when the operator initially positions the test object in any retroreflecting or confocal position. In general, the reflectivity of coating 34' on reference element 34 is selected such that null fringes are visible on monitor 49 over a large range of null positions by balancing the contrasts found in high and low order nulls. The visibility or contrast is given by $$V = \frac{2\sqrt{ItIr}}{It + Ir}. \tag{13}$$

where Ir is the reference intensity and It is the test intensity. The reference intensity is defined as $$Ir = I_0 Rr, \tag{14}$$

where Rr is the reflectivity of coating 34', and the test intensity is defined as $$It = I_0(1-Rr)^2 Rm^N Rr^{N-1}. \tag{15}$$

where Rm is the reflectivity of the test object and N is the null order. FIG. 8 is a plot of calculated contrast for a coating reflectivities of 0.9, 0.8, 0.7, and 0.6 as a function of null order up to N=10. For N=2 to 10, a coating reflectivity of 0.7 provides good contrast both at low and high null orders. If the operator knows apriori where to position the test object relative to the reference object to obtain a specific null order, the operator can calculate which reflectivity provides the best fringe contrast and, based on this value, interchange reference objects into apparatus 100 having the desired reflectivity coating.

Measurement Error

Apparatus 100 measures three parameters, i.e., the null order, the wavelength shift and the cavity OPD. The null order is an integer and therefore is assumed to be determined by the CPU without any uncertainty. Uncertainty in the OPD measurements results from errors associated with monitoring the wavelength shift and the phase change of the interferometric cavity. Assuming uncorrelated errors between the OPD and optical frequency (wavelength) shift measurements, the fractional error in the cavity OPD is:

$$\frac{\Delta D}{D} = \sqrt{\left(\frac{\Delta \varphi}{\varphi}\right)^2 + \left(\frac{\Delta \dot{v}}{\dot{v}}\right)^2} \tag{16}$$

where a variable preceded by a delta sign represents the error in that variable. The fractional error in $\dot{v}$ is:

$$\frac{\Delta \dot{v}}{\dot{v}} = \sqrt{\left(\frac{\Delta \dot{\phi}}{\dot{\phi}}\right)^2 + \left(\frac{\Delta L_m}{L_m}\right)^2} \tag{17}$$

Combining Eqns. 16 and 17 provides the total fractional uncertainty in OPD as $$\frac{\Delta D}{D} = \sqrt{\left(\frac{\Delta \varphi}{\varphi}\right)^2 + \left(\frac{\Delta \dot{\phi}}{\dot{\phi}}\right)^2 + \left(\frac{\Delta L_m}{L_m}\right)^2}. \tag{18}$$

The total fractional uncertainty in OPD, in turn, is used to determine the uncertainties associates with calculating the radius of curvature.

For concave mirrors, the dependence of R on L as shown in Table 1 is linear. Using the relationship $$\Delta R = \frac{\partial R}{\partial L} \Delta L$$

and since D=2NL to an excellent approximation, $\Delta R$ can be rewritten as $\Delta R=$ $$\frac{\Delta D}{2N} \frac{\partial R}{\partial L}.$$

For N<10 the sensitivity, $$\frac{1}{2N} \frac{\partial R}{\partial L},$$

is approximately 1 (as can be verified via Table 1). As a result, for null orders less than 10, the uncertainty in the radius of curvature is approximately equal to the uncertainty in the OPD, i.e., $\Delta R \approx \Delta D$.

For convex mirrors ΔR, as in the concave case, can be rewritten as $$\Delta R|_N = \frac{\Delta D}{2N} \frac{\partial R}{\partial L}\bigg|_N$$

with the sensitivity $$\frac{\partial R}{\partial L}\bigg|_N$$

obtained by using the equations in Table 1. In general, the sensitivity depends nonlinearly on both L and F. As an example, consider the case when N=2. From Table 1, the sensitivity is:

$$\frac{\partial R}{\partial L}\bigg|_{N=2} = \frac{-2(F^2 - 2FL + 2L^2)}{(2L-F)^2}. \tag{19}$$

But at a cavity null, the gap is given by:

$$L = \frac{1}{2}\left[F - R + \sqrt{R^2 + F^2}\right]. \tag{20}$$

Substituting of (11) into (12) produces the following equation describing the sensitivity in terms of the ratio a =F/R;

$$\frac{\partial R}{\partial L}\bigg|_{N=2} = \frac{-2(a^2 + 1 - \sqrt{1+a^2})}{(1 - \sqrt{1+a^2})^2} \tag{21}$$

Figure 9:
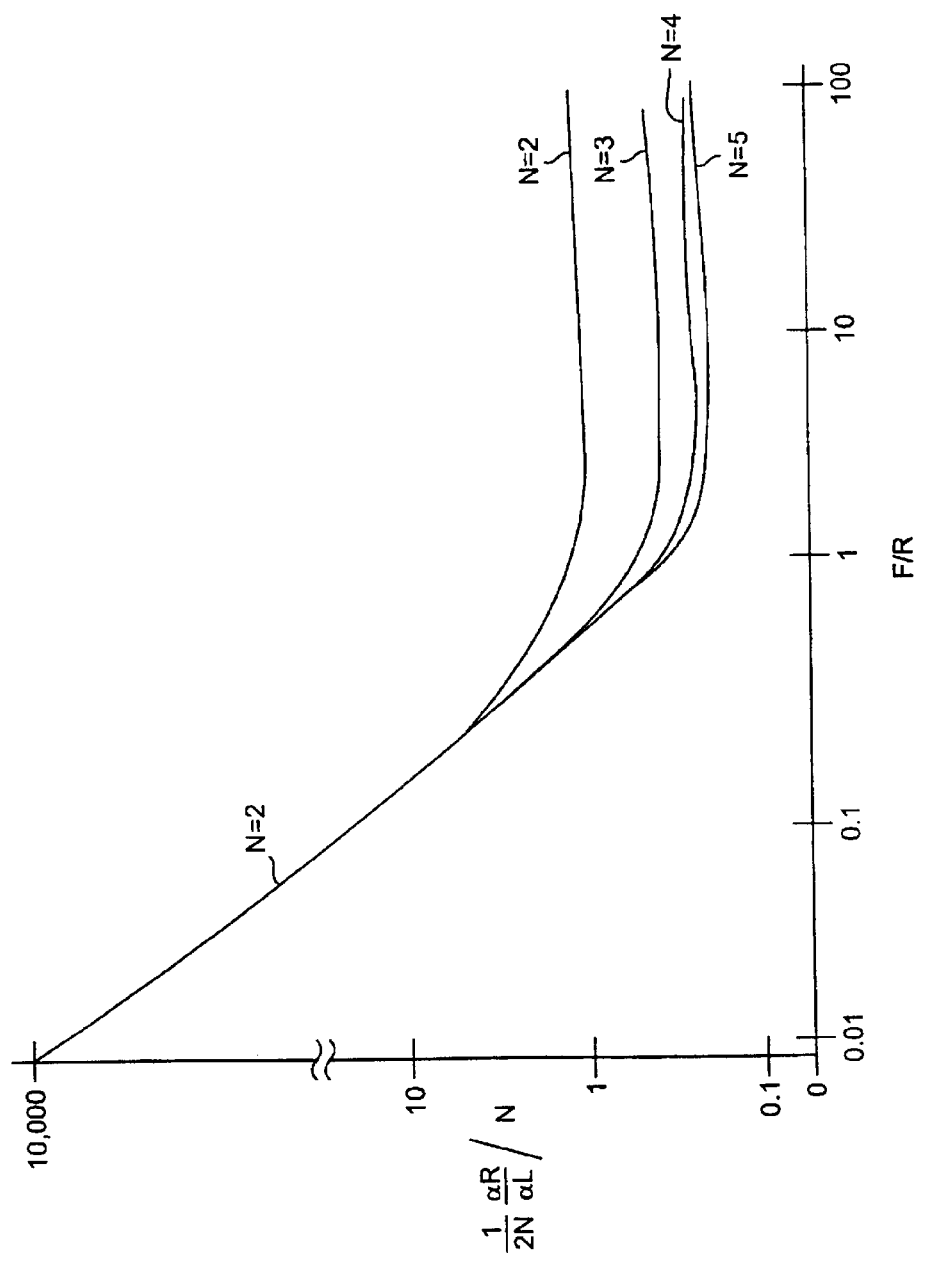
FIG. 9 is a plot of the absolute value of sensitivity, $$\frac{1}{2N}\frac{\partial R}{\partial L}\bigg|_N,$$

Referring to FIG. 9, a plot shows the absolute value of $$\frac{1}{2N} \frac{\partial R}{\partial L}\bigg|_N$$

as a function of a for the first 5 null orders. All sensitivities approach a finite limit for large a (F>>R), but increase rapidly as $1/a^2$ for small a (F<<R). At higher null orders, the sensitivity at F/R>1 also decreases from about 1 to about 0. 1 with increasing null order. As a result, for F/R>1, the uncertainty in the radius of curvature is approximately equal to or less than the uncertainty in the OPD, i.e., ΔR≦ΔD.

The fractional error in the radius, ΔR/R, expressed as a percent of the true radius can be determined by the CPU and is useful in assessing the performance of apparatus 100. For concave objects, ΔR/R should decrease as R increases since ΔR≈ΔD is essentially constant. For convex mirrors, the CPU calculates the fractional uncertainty in the radius by multiplying the sensitivity $$\frac{1}{2N} \frac{\partial R}{\partial L}\bigg|_N$$

and a ratio ΔD/R. For F/R>1, the fractional uncertainty decreases (increases) as R increases (decreases) because the sensitivity is essentially constant. For F/R<1, the fractional uncertainty increases as R increases because for fixed F, the sensitivity increases more rapidly than R. As a result, the fractional uncertainty in the radius for convex surfaces is minimized when F/R=1.

Errors due to high order optical aberrations and imperfections in the optical components of apparatus 100 are expected to be smaller than the errors discussed above, but can be determined numerically. Departures from pure sphericity in the mirror surface also can be determined by the apparatus via an analysis of the intensity data detected by camera 46.

The wavelength monitor OPD stability effects the accuracy at which apparatus 100 calculates the interferometer OPD. In general, longer wavelength monitor OPDs provide a more accurate measure of the wavelength shift but are more difficult to keep stable. A typical wavelength monitor has an OPD of at least about 250 mm, is stable to better than 1 part in $10^6$ over an expected operating temperature range, and is insensitive to moderate acoustical and seismic influences. Wavelength monitor cavities exhibiting the desired stability can be produced by assembling the interferometer on a bed of invar ($T_c=8\cdot10^{-7}$). If the temperature of the bed is known to 1° C. then the fractional uncertainty in the cavity monitor length is ≈$10^{-6}$. If higher degrees of stability are necessary, the fractional uncertainty can be reduced by another factor of ten by replacing the bed of invar with Zerodur. Alternatively, a higher degree of stability can be achieved by using a fiber interferometer.

Referring to FIG. 10, a fiber interferometer 200 includes a long length of optical fiber 202 spiraled and embedded into a thermo-electrically cooled base 204. Two couplers 206 and 208 separate and then recombine the fibers to produce long and short optical paths. The OPD of interferometer 200 is large, e.g., about 1 m. Interferometer 200 is housed in a small package (approx 50 mm×50 mm×10 mm). The thermal expansion coefficient of quartz, the material of optical fiber 202 and couplers 206 and 208, is less than $10^{-6}$ and the index temperature sensitivity is about $10^{-5}$. Assuming an effective wavelength monitor OPD temperature variation coefficient of fiber 202 of about $10^{-5}$ and a temperature control of base 204 to about 0.01° C., the cavity length can be stabilized to about $10^{-7}$.

The detectors used in both the wavelength shift monitor and test cavity monitor are standard silicon devices. The necessary detector/amplifier bandwidth is determined by the maximum fringe frequency, $f$, which depends on the optical frequency sweep rate $\dot{v}$ and the longest anticipated test cavity OPD, $D_{max}$, via $$f = \frac{\dot{v} D_{max}}{c}. \tag{22}$$

For a cavity OPD of 20 m, a 50 GHz sweep and a sweep frequency of 100 Hz, the maximum fringe frequency is only 333 KHz. In general, the detector bandwidth must be at least 3 times this frequency, e.g., 1 MHz, or higher. At a 1 MHz sample rate, less than 20K samples of 16bit data are acquired by each detector and sent to the CPU during the sweep. Both the wavelength monitor and the Fizeau interferometer detectors are sampled simultaneously thereby eliminating any requirements regarding how linearly the CPU shifts the center wavelength of the light beam. As discussed above, the CPU determines the phase evolution in each cavity, i.e., wavelength monitor and Fizeau interferometer, from these data using a phase extraction algorithm such as the sliding window FFT method.

Small Radii (Radii Less than About 100 mm)

Using the cavity geometry of FIG. 2 for measuring concave surfaces with small radii results in fringe patterns on camera 46 that are too small to be reliably used for positioning the test object at a null position of the cavity. For convex surfaces, as the radius decreases below about 100 mm, the amount of the surface area of the test object used in the radius measurement also decreases thereby reducing the area over which the apparatus can generate a phase map of the test object's surface. These problems can be addressed by using different cavity geometries as described below.

As shown in FIG. 11, a cavity geometry 300 for measuring concave surfaces with small radii includes a concave reference element 330 and a test object 350 having a concave surface 355. Concave surface 355 is positioned relative to element 330 such that the distance, M, from the object's surface to focal point, P, of element 330 is equal to radius of object 350. Cavity geometry 300 produces a single null fringe on the CCD camera (not shown). The size of this fringe depends only on the relative numerical apertures (NA) of the reference element and the test object. A single large null fringe representing a wavefront produced from the entire surface of the test object is observed on the visual output of camera 46 provided that the NA of the reference element is larger than the NA of the test object. Using the visual output of the camera, the system operator translates test object 350 until a single large fringe appears which indicates that object 350 is positioned relative to element 330 to create cavity geometry 300.

As shown in FIG. 12, a cavity geometry 400 for measuring convex radii less than 100 mm has a null order of 1. Cavity geometry 400 includes a concave reference element 430 having a focus and a test object 450 having a convex surface 455 and a back surface 460. The operator positions back surface 460 at the focal point, P, of element 430. Once positioned, apparatus 100 determines the radius of curvature as described above, except that the CPU does not need to determine the null order of the cavity. The CPU translates mount 38, records intensity histories on the camera, calculates a measured phase map of the test object's surface, and stores the map in memory. Apparatus 100 measures the OPD by shifting the center wavelength of the light beam while simultaneously monitoring the change in phase in the wavelength monitor and Fizeau interferometer monitor. The CPU uses these values to calculate a measured OPD and uses this value with the known focal length of the reference element to determine the radius of curvature of the test object. The CPU also corrects positioning errors by comparing a measured phase map to a theoretical map produced from the known focal length and measured OPD.

Using the paraxial approximation, the measured OPD (L) will be equal to 2(F+R) (2(F−R)) for concave (convex) mirrors when correctly nulled. To a first approximation, the radii are given by (L−2F)/2 and ((2F−L)/2). The procedure for correcting the positioning errors presupposes that F is accurately known. In general, the focal length of a reference element is not constant but changes with temperature. Apparatus 100 provides a convenient solution to this problem by calibrating the reference element focal length.

Referring to FIG. 13, a system operator positions a curved surface 605 of a test object 610 at the focal point, P, of reference object 620, i.e., at the cats-eye position. Once in this position, the CPU shifts the center wavelength of the light beam and simultaneously records intensity data from the wavelength monitor and Fizeau interferometer monitor. Using this data, the CPU determines the OPD and calculates the focal length of the reference object. The CPU can also correct deviations from the perfect cats-eye position and the focal length by iteratively comparing the measured phase map at the cats-eye position with a theoretical phase map created with the known focal length and measured OPD.

The radius fractional uncertainty, ΔR/R, depends linearly on the ratio F/R for both convex and concave small radius mirrors. Thus for fixed F the fractional uncertainty increases as R decreases. Assuming an OPD fractional uncertainty of $10^{-6}$, and including null cavity correction and phase errors, the fractional uncertainty for convex and concave surfaces linearly tracks the OPD error as 0.0001% per unit F/R. At F/R of 1, the fractional uncertainty is 0.0001% and at F/R of 10, the fractional uncertainty is about 0.001%.

Depending on the reflectivity of the reference and test surfaces, the confocal cavities shown in FIGS. 11 and 12 act as high finesse Fizeau cavities in which there are multiple retroreflections which propagate into the interferometer monitor. The reflectivity of the cavity R is related to the reflection amplitude for multiple beam interference by the relationship $$R = |r|^2 \quad (23)$$

where $$r = \frac{r_1 + r_2 e^{i\beta}}{1 + r_1 r_2 e^{i\beta}}, \quad (24)$$

with β=kL, L is the OPD; and r1 and r2 are the complex reflection amplitudes of the two surfaces in the cavity. For high surface reflectivities, the presence of multiple beam interference creates integer multiples of the fundamental frequency at which the intensity oscillates on the wavelength shift monitor and the cavity detector. The multiple beam interference distorts the intensity interferogram such that the intensity variation caused by moving the reference element or shifting the wavelength will no longer be a pure sinusoid (See Eqn.1). FIG. 14A shows the expected intensity variation for an aluminum mirror (80% reflectivity) and a reference surface made with a 70% reflective dielectric coating resulting from multiple beam interference. FIG. 14B shows the intensity variation for the retroreflecting cavity of FIG. 2 which does not suffer from multiple beam interference.

In general, the presence of multiple beam interference is not a serious problem when determining the OPD. First, the quantity, quality and density of the intensity data recorded by the cavity detectors is high enough so that the band-limiting characteristics of the phase shifting algorithms used for extracting the phase in the OPD measurement easily track the fundamental frequency by reducing the sensitivity of the algorithm to higher-order frequencies caused by the multiple beam interference. Second, any phase error is cyclic and averages out over the multiple cycles recorded for the OPD measurement.

The multiple beam interference also creates potential Problems in the intensity data recorded by the CCD camera for computing a phase map and surface profile of the test object. In general, due to the limited operating rate of the CCD camera apparatus 100 acquires significantly less data from the camera with sparser density than it does from the cavity detectors. As a result, the phase shifting algorithms cannot isolate the fundamental frequency as well as they did for the OPD measurement. For example, in a 13 frame algorithm, apparatus 100 records 13 intensity frames with 45 degree phase shifts between each frame. This particular algorithm has band-limiting characteristics which reduce the sensitivity of the algorithm to all even and odd harmonics of the fundamental frequency up to order seven but produce almost 20 nm of Peak-to-Valley (PV) error when used to analyze the intensity history shown in FIG. 14A. One method for reducing this error involves reducing the magnitude of the multiple beam interference by changing the reflectivity of the reference object. For instance, if the reference object were left uncoated (a 4% reflectivity) the phase error associated with the 13 bucket algorithm drops to less than 0.2 nm PV. Of course, a lower reference reflectivity also reduces the contrast available on the CCD camera for aligning the test object and recording intensity data for phase mapping and surface profiling. The change in the contrast from a 4%–80% cavity to a 70%–80% cavity decreases by about a factor of 7, but still provides over 500 gray levels on a 12 bit CCD camera for the aligning and recording intensity data.

Alternatively, apparatus 100 can shift the center wavelength of the light beam rather than translating the reference object to acquire intensity histories on the CCD camera. Shifting the wavelength generates a longer phase excursion, i.e., produces many more oscillations in the intensity history, than mechanically moving the reference object. Due to the increase in phase excursion, the CPU is able to record an increased number and density of intensity samples which, in turn, reduces the sensitivity of the phase shifting algorithms to non-fundamental frequencies. The CPU processes the intensity data by using a phase shifting algorithm, such as a windowed FFT, on each pixel's intensity history. For instance, apparatus 100 shifts the wavelength and the CCD camera records 64 consecutive frames at 22.5 degree phase increments. The acquisition would take only ½ second for a 120 Hz camera, and the distortion induced phase error for a 70%–80% cavity would be less than 1 nm PV, i.e., improvement by a factor of 20.

A number of embodiments of the invention have been described. Nevertheless, it will be understood that various modifications may be made without departing from the spirit and scope of the invention. For example, although measuring small radii of concave surfaces are described in the context of cavity geometries having the concave surface at the first null position, small radii of concave surfaces can be measured via cavity geometries having null positions greater than one. In these scenarios, the cavity geometry requires a larger working surface, i.e., a larger OPD, relative to larger radii. In addition, the relative change in the characteristic wavelength emitted from the light source can be determined by monitoring electronic signals from the light source. For instance, the light source can be calibrated so that a specific change in a driver current corresponds to a known change in optical frequency output. Monitoring the relative change in driver current could, in turn, be used to determine the relative change in the optical frequency of the characteristic wavelength.

EXAMPLES

Fractional Error Simulations

The percent fractional error obtained from simulating measurements on concave and convex mirrors having radii ranging from 100 mm to 150 m are listed in Tables 2 and 3. The wavelength shift detector was assumed to have 14 effective bits and cavity detector was assumed to have 12 effective bits. Results from a Sliding Window DFT simulation have shown that with this precision, the uncertainty in the phase evolution would be $\Delta\phi=5\times10^{-5}$ and $\Delta\phi=2\times10^{-4}$ for a 0.3 m wavelength monitor cavity and a 1 m OPD in a Fizeau interferometer cavity, respectively. Using these numbers and assuming a 50 GHz optical frequency tuning range, the contribution to the fractional error in D from both phase measurements is less than 0.00002%. The fractional uncertainty in the optical length of the wavelength shift monitor was assumed to be $10^{-6}$ (0.0001%) making it the dominant source in the fractional error in D. The results are displayed assuming null cavity error correction. Null cavity gap errors are assumed to be 1 micron after correction.

The tables display all the features predicted by the paraxial analysis. For concave mirrors ΔR/R drops as R increases, and for convex mirrors, a minimum in ΔR/R is observed near F/R=1. In fact, if the null cavity error can be ignored, the minimum occurs exactly at F/R=1 for all orders.

TABLE 2

Simulated Errors for Measurements of Convex Radii

| Radius (m) | Focal Length(m) | Order | F/R | Gap (mm) | $\frac{\Delta R}{R}(\%)$ |
|---|---|---|---|---|---|
| 0.1 | 1 | 5 | 10 | 910.49 | 0.00113 |
| 0.5 | 1 | 2 | 2 | 809.02 | 0.00072 |
| 1 | 1.5 | 3 | 1.5 | 911.44 | 0.00025 |
| 5 | 4.5 | 6 | 0.9 | 1002.88 | 0.00007 |
| 10 | 4.5 | 4 | 0.45 | 1011.99 | 0.00021 |
| 50 | 4.5 | 4 | 0.09 | 713.01 | 0.00174 |
| 150 | 4.5 | 4 | 0.03 | 676.25 | 0.00568 |

TABLE 3

Simulated Errors for Measurements of Concave Radii

| Radius (m) | Order | Gap (mm) | $\frac{\Delta R}{R}(\%)$ |
|---|---|---|---|
| 0.1 | 2 | 49.94 | 0.00199 |
| 0.5 | 2 | 249.99 | 0.00040 |
| 1 | 2 | 499.99 | 0.00020 |
| 5 | 4 | 732.23 | 0.00014 |
| 10 | 5 | 954.91 | 0.00011 |
| 50 | 11 | 1012.68 | 0.00010 |
| 150 | 19 | 1022.90 | 0.00009 |

Accordingly, other embodiments are within the scope of the following claims. For example, though the wavelength monitor was described as a Michelson interferometer, other types of interferometers could be used, e.g. a fiber or bulk optic interferometer or a Mach-Zehnder interferometer. It should also be clear that the wavelength monitor only needs to be used if the wavelength uncertainty when scanning is to large.

It should also be understood that the different configurations, i.e., cats-eye and confocal configurations, have different advantages and limitations. For example, the confocal configuration tends to result in higher sensitivity and/or greater accuracy whereas the cats-eye configuration tends to be appropriate for long radius measurements in which one needs to limit the size of the space required for making the measurement.

Other aspects, advantages, and modifications are within the scope of the following claims.

What is claimed is:

1. An interferometric system for measuring a radius of curvature of a measurement object, said system comprising:
   a tunable coherent radiation source capable of emitting a radiant energy beam having a characteristic wavelength and of scanning the characteristic wavelength over a range of wavelengths;
   an unequal path interferometer which during operation includes a reference object and the measurement object and which receives a portion of the radiant energy beam from the tunable radiant energy source and generates an optical interference pattern;
   a detecting system including a detector for receiving the optical interference pattern;
   a system controller connected to the tunable radiant energy source and the detecting system, said controller programmed to cause the tunable radiant energy source to scan the characteristic wavelength over said range of wavelengths while concurrently monitoring the optical interference pattern via the detecting system and further programmed to calculate the radius of curvature of a surface of the measurement object from the monitored optical interference pattern; and a wavelength change monitor configured to monitor changes in the characteristic wavelength of the radiant energy source, wherein said system controller is arranged to receive output from the wavelength change monitor and is programmed to calculate the radius of curvature of the surface of the measurement object from a monitored change in the wavelength and the monitored optical interference pattern.

2. The system of claim 1, wherein the system controller is further programmed to calculate a phase shift in the measured optical interference pattern caused by scanning the characteristic wavelength, wherein the system controller uses the calculated phase shift to compute said radius of curvature.

3. The system of claim 2, wherein the system controller is further programmed to compute an optical path difference from the calculated phase shift, wherein the system controller uses the computed optical path difference to compute said radius of curvature.

4. The system of claim 3 wherein the system controller is programmed to use numerical simulation to compute said radius of curvature.

5. The system of claim 3 wherein the system controller is programmed to recursively compute said radius of curvature.

6. The system of claim 3 wherein during operation the reference and measurement objects form an interferometric cavity with the measurement object approximately in a null position and the system controller is further programmed to correct the computed radius of curvature to take into account possible initial positioning errors of the measurement object relative to said null position.

7. The system of claim 6 wherein during operation the reference and measurement objects form an interferometric cavity with the measurement object in a null position having a null order of n, wherein n is an integer at least as great as 2, and wherein the system controller is programmed to compute the null order for the interferometric cavity.

8. The system of claim 1, wherein the tunable radiant energy source is a tunable light source.

9. The system of claim 1, wherein the unequal path interferometer is a Fizeau interferometer.

10. The system of claim 1, wherein the system controller is programmed to calculate the change in the characteristic wavelength and a phase variation of the optical interference caused by scanning the characteristic wavelength over the range of wavelengths.

11. The system of claim 10, wherein the system controller is further programmed to use the calculated wavelength change and the calculated phase variation to calculate an optical path difference in the interferometer, wherein the system controller uses the computed optical path difference to compute said radius of curvature.

12. The system of claim 1, wherein the wavelength change monitor includes a detector and an unequal fixed path length interferometer.

13. The system of claim 12, wherein the unequal fixed path length interferometer is one of an optical fiber interferometer, a Michelson interferometer, and a Mach-Zehnder interferometer.

14. The system of claim 1, wherein the reference object has a curved surface.

15. The system of claim 14, wherein the curved surface is concave.

16. An interferometric system for use with a measurement object, comprising:

a tunable coherent radiation source capable of emitting a radiant energy beam having a characteristic wavelength and of scanning the characteristic wavelength over a range of wavelengths;

a wavelength change monitor configured to monitor a change in the characteristic wavelength of the radiant energy beam;

an interferometer which during operation includes a reference object and the measurement object to form an interferometric cavity and which during operation also receives the radiant energy beam from the tunable light source and generates an optical interference pattern therefrom;

a detecting system comprising a detector for receiving the optical interference pattern; and a system controller connected to the tunable radiant energy source, the wavelength change monitor and the detecting system, said controller programmed to cause the tunable radiant energy source to scan the characteristic wavelength over said range of wavelengths while concurrently monitoring the optical interference pattern via the detecting system and further programmed to calculate the radius of curvature of a surface of the measurement object from the monitored optical interference pattern.

17. The system of claim 16, wherein the tunable radiant energy source is a tunable light source.

18. The system of claim 16, wherein the interferometer is an unequal path interferometer.

19. The system of claim 16, wherein the system controller is further programmed to calculate a phase shift in the measured optical interference pattern caused by scanning the characteristic wavelength, wherein the system controller uses the calculated phase shift to compute said radius of curvature.

20. The system of claim 19, wherein the system controller is further programmed to compute an optical path difference from the calculated phase shift, wherein the system controller uses the computed optical path difference to compute said radius of curvature.

21. The system of claim 20, wherein the system controller is programmed to use numerical simulation to compute said radius of curvature.

22. The system of claim 20, wherein the system controller is programmed to recursively compute said radius of curvature.

23. A method for interferometrically determining a radius of curvature of a curved surface of a measurement object, the method comprising:

positioning the measurement object relative to a reference object to form an interferometric cavity;

scanning a characteristic wavelength of a radiant energy beam over a range of wavelengths;

recording an optical interference signal caused by the interferometric cavity as the characteristic wavelength of the radiant energy beam scans over a range of wavelengths;

extracting a phase variation from the optical interference signal;

determining a relative change in the characteristic wavelength which caused the extracted phase variation;

determining an optical path difference between the reference and measurement objects from the phase variation and the relative change in frequency of the characteristic wavelength; and calculating the radius of curvature for the curved surface of the measurement objects, wherein determining the relative change in the optical frequency of the characteristic wavelength involves monitoring the relative optical frequency change of the characteristic wavelength.

24. The method of claim 23, wherein calculating the radius involves using the optical path difference and a null order of the interferometric cavity.

25. The method of claim 23 further comprising determining a null order of the interferometric cavity.

26. The method of claim 25, wherein determining the null order involves performing mechanical phase shifting.

27. The method of claim 23, wherein positioning of the measurement object involves positioning it relative to the reference object so as to form a confocal cavity.

28. The method of claim 23, wherein positioning of the measurement object involves positioning it relative to the reference object so as to form a retroreflecting cavity having a null order equal to n, wherein n is an integer that is at least as large as 2.

29. The method of claim 23, wherein positioning the measurement object involves positioning it relative to the reference object to form a confocal cavity having a null order of 1.

30. The method of claim 23 further comprising extracting a 2-dimensional phase variation from the optical interference signal.

31. The method of claim 30 further comprising using the 2-dimensional phase information to correct the calculated optical path difference between the reference and measurement objects.

32. The method of claim 23, wherein calculating the radius of curvature for the curved surface of the measurement object is based on the optical path difference between the reference and measurement objects.

* * * * *